E. G. JOHANSON.
LIGHT RAYS REFRACTOR.
APPLICATION FILED JUNE 24, 1916.

1,204,023.

Patented Nov. 7, 1916.

Emil G. Johanson
INVENTOR.

BY
ATTORNEYS.

UNITED STATES PATENT OFFICE.

EMIL G. JOHANSON, OF CHICAGO, ILLINOIS.

LIGHT-RAYS REFRACTOR.

1,204,023.

Specification of Letters Patent.

Patented Nov. 7, 1916.

Application filed June 24, 1916. Serial No. 105,672.

*To all whom it may concern:*

Be it known that I, EMIL G. JOHANSON, a subject of the King of Sweden, residing at Chicago, in the county of Cook and State of Illinois, have invented new and useful Improvements in Light-Rays Refractors, of which the following is a specification.

This invention has for its object to provide a novel and improved translucent glass structure designed more particularly for use in connection with motor vehicle headlights, and embodying a structure whereby the light rays are diffused, and their direct passage through the glass is reduced to a minimum, so that the intense glare is entirely eliminated.

Figure 1:
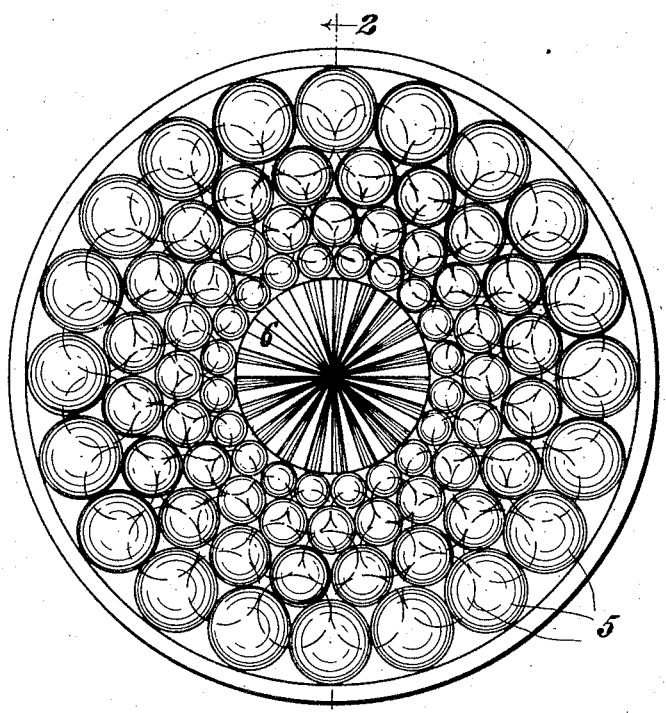
Figure 2:
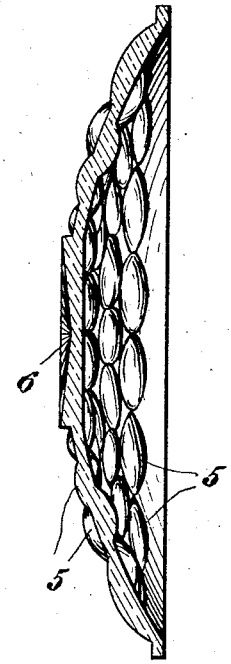

In the accompanying drawing, Figure 1 is a plan view showing one embodiment of the invention, and Fig. 2 is a cross section on the line 2—2 of Fig. 1.

Referring specifically to the drawing, the glass here shown is circular and concavo-convex, and both sides thereof are formed with series of protuberant lenses 5, the same being arranged in concentric circles, and those of one circle being situated in alternation with those of the next inner and outer circles. On account of the concentric design, the lenses increase in size radially. The lenses on the concave or rear side of the glass are arranged in the same manner as the lenses on the convex or front side of the glass, but they are also arranged staggered with respect to the latter, this staggered arrangement being followed with respect to the circles and on radial lines, as will appear from an inspection of Fig. 1, in which the lenses of the convex side of the glass are shown dotted.

The purpose of the staggered arrangement of the two sets of lenses 5 is to cover as much as possible the spaces between the lenses on the convex side of the glass by the use of the same design. Furthermore, regularity of design is preserved for the reason that the circles of lenses on the concave side fall between the circles of lenses on the convex side, and this also assists in rendering the radial enlargement of the lenses gradual, resulting in a uniform diffusion of light.

In the center of the glass is a lens 6 commonly used for breaking up the central glare of the headlight, and being composed of a series of triangular prisms having one face coincident with the basal surface and arranged in a circle to have their apices meet at one point, or at the center of the basal surface.

I claim:

1. A light rays refractor comprising a glass unit formed with protuberant lenses on both sides, said lenses being arranged in concentric circles, the circles and the lenses of the respective circles on one side being staggered with respect to the circles and the lenses of the respective circles on the other side, and the lenses in the circles on both sides of the unit increasing in size outward from the center of the unit.

2. A light rays refractor comprising a concavo-convex glass unit formed with protuberant lenses on both sides, said lenses being arranged in concentric circles, the circles and the lenses of the respective circles on one side being staggered with respect to the circles and the lenses of the respective circles on the other side, the lenses in the circles on both sides of the unit increasing in size outward from the center of the unit.

In testimony whereof I affix my signature.

EMIL G. JOHANSON.